(12) United States Patent
Yue et al.

(10) Patent No.: US 9,071,471 B2
(45) Date of Patent: Jun. 30, 2015

(54) LOW-COMPLEXITY ESTIMATION OF QAM SYMBOLS AND CONSTELLATIONS

(71) Applicant: NEC Laboratories America, Inc., Princeton, NJ (US)

(72) Inventors: Guosen Yue, Edison, NJ (US); Sampath Rangarajan, Bridgewater, NJ (US)

( * ) Notice: Subject to any disclaimer, the term of this patent is extended or adjusted under 35 U.S.C. 154(b) by 0 days.

(21) Appl. No.: 14/214,497

(22) Filed: Mar. 14, 2014

(65) Prior Publication Data

US 2014/0270023 A1 Sep. 18, 2014

Related U.S. Application Data

(60) Provisional application No. 61/783,704, filed on Mar. 14, 2013.

(51) Int. Cl.
*H03K 9/02* (2006.01)
*H04L 27/02* (2006.01)
(52) U.S. Cl.
CPC ....................................... *H04L 27/02* (2013.01)
(58) Field of Classification Search
CPC .................. H04L 25/4902; H04L 25/4917
USPC ................................................... 375/353, 332
See application file for complete search history.

(56) References Cited

U.S. PATENT DOCUMENTS

| | | | | |
|---|---|---|---|---|
| 8,069,399 B2* | 11/2011 | Osnato et al. | ................. | 714/786 |
| 2011/0058632 A1* | 3/2011 | Siti et al. | ........................ | 375/340 |
| 2013/0064313 A1* | 3/2013 | Gatti et al. | .................... | 375/260 |

* cited by examiner

*Primary Examiner* — Daniel Washburn
*Assistant Examiner* — Fitwi Hailegiorgis
(74) *Attorney, Agent, or Firm* — Joseph Kolodka (57) ABSTRACT

Disclosed are methods and structures for soft symbol and variance estimation for QAM constellations including a big-flipping framework and efficient methods for soft symbol estimation and variance estimation for QAM. Disclosed are efficient Gray mapping which provides a much lower complexity, i.e., log N for N-QAM for both squared and non-squared QAM constellations. Also disclosed is an approximation method that avoids multiplications completely while exhibiting only a slight performance degradation. Finally, a low complexity method for variance estimations, particularly second moment estimations for both squared and non-squared QAM constellations with Gray mapping are disclosed. Advantageously—using the disclosed methods—the complexity of the second moment estimation is reduced to $O((\log N)^2)$ for an N-QAM symbol for both squared and non-squared QAM.

2 Claims, 8 Drawing Sheets

LOW-COMPLEXITY ESTIMATION OF QAM SYMBOLS AND CONSTELLATIONS

CROSS REFERENCE TO RELATED APPLICATIONS

This application claims the benefit of U.S. Provisional Patent Application No. 61/783,704 filed Mar. 14, 2013.

TECHNICAL FIELD

This disclosure relates generally to the field of wireless communications systems and in particular to low-complexity schemes to compute soft symbol and variance estimations of a quadrature amplitude modulation (QAM) signal.

BACKGROUND

As is known, wireless communications are becoming an increasingly indispensible aspect of contemporary life. Accordingly, systems, methods and techniques that enhance the efficiency of wireless communications systems are a welcome addition to the art.

SUMMARY

An advance is made in the art according to an aspect of the present disclosure directed to methods for soft symbol and variance estimation for QAM constellations. According to an aspect of the present disclosure describing a big-flipping framework and efficient methods for soft symbol estimation and variance estimation for QAM.

According to one aspect of the present disclosure, efficient Gray mapping is realized thereby providing a much lower complexity, i.e., log N for N-QAM for both squared and non-squared QAM constellations. Also disclosed is an approximation method that avoids multiplications completely while exhibiting only a slight performance degradation. Finally, a low complexity methods are disclosed for variance estimations, particularly second moment estimations for both squared and non-squared QAM constellations with Gray mapping. Advantageously—using the disclosed methods—the complexity of the second moment estimation is reduced to $O((\log N)^2)$ for an N-QAM symbol for both squared and non-squared QAM.

BRIEF DESCRIPTION OF THE DRAWING

A more complete understanding of the present disclosure may be realized by reference to the accompanying drawings in which.

DETAILED DESCRIPTION

The following discussion and attached Appendix-A and Appendix-B merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we note that since the discovery of turbo codes, the turbo processing or turbo principle has drawn significant attention in the wireless and signal processing arts. For channels with memory, e.g., intersymbol-interfering (ISI) channel, multi-access channel (MAC), or multiple-input multiple output (MIMO) fading channel, joint optimal decoding is practically infeasible due to extremely high complexity.

Employing the turbo process with soft interference cancellation (SIC) and a powerful channel code, e.g., a turbo code or a low density parity check (LDPC) code, the iterative receiver can offer near-capacity performance for these channels by performing iterative demodulation and decoding with the extrinsic messages iteratively updated and passed through a soft demodulator and soft decoder.

When quadrature amplitude modulation (QAM) is employed, the soft QAM estimation or reconstruction based on the decoder outputs is then a necessary step for SIC in the iterative receiver. When the linear minimum mean square error (MMSE) filter is employed as a front end symbol demodulator, we also need to estimate the variance of the interfering QAM symbols, i.e., the variance of residual interference after the SIC. Such an iterative receiver—a turbo receiver—has been applied to the equalization, multiuser detection and the MIMO receiver for ISI, MAC, and MIMO channels, respectively.

Due to its significant performance gain over a conventional receiver, the iterative receiver is considered a promising technique in commercial cellular systems. However, even with very limited number of iterations, the complexity of an iterative receiver is still very high such that it may only be possible to implement at a base station for uplink transmissions. Accordingly, it is necessary to reduce the complexity of iterative receivers.

As noted previously, one aspect of the present disclosure is a low-complexity method for both soft symbol and variance estimations for QAM constellations. In particular, we describe a bit-flipping framework to achieve low-complexity. For soft symbol estimation, we consider the squared-QAM which can be decomposed to two orthogonal Pulse Amplitude Modulations (PAM). We present two simplified bit flipping based approaches for the general bit-to symbol mapping of PAM constellations.

Figure 1:
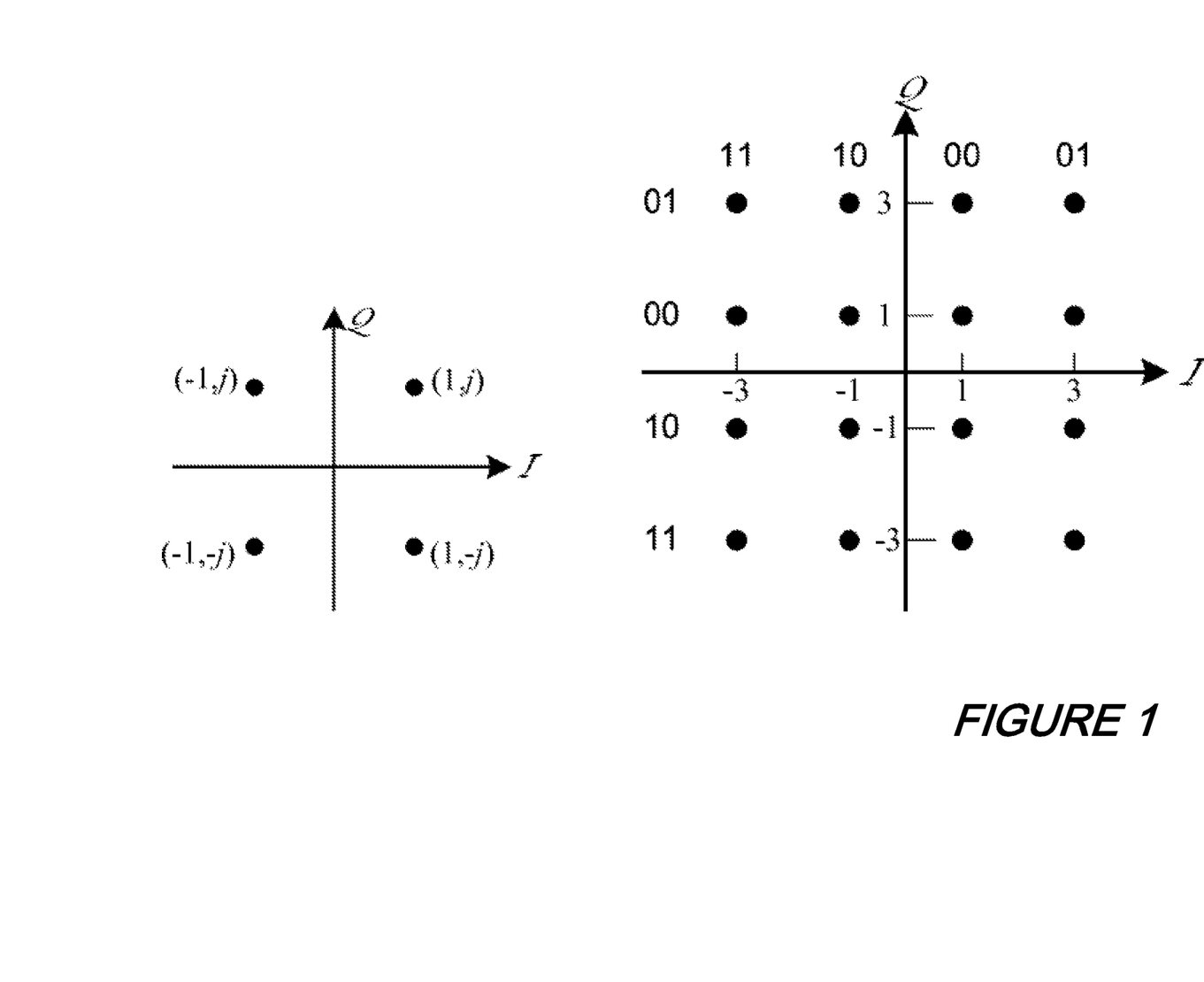
FIG. 1 is a graph showing examples of QAM constellations with 4-QAM (left) and 16-QAM (right) according to the present disclosure.

FIG. 1 is a graph showing examples of QAM constellations with 4-QAM (left) and 16-QAM (right) according to the present disclosure.

Figure 2:
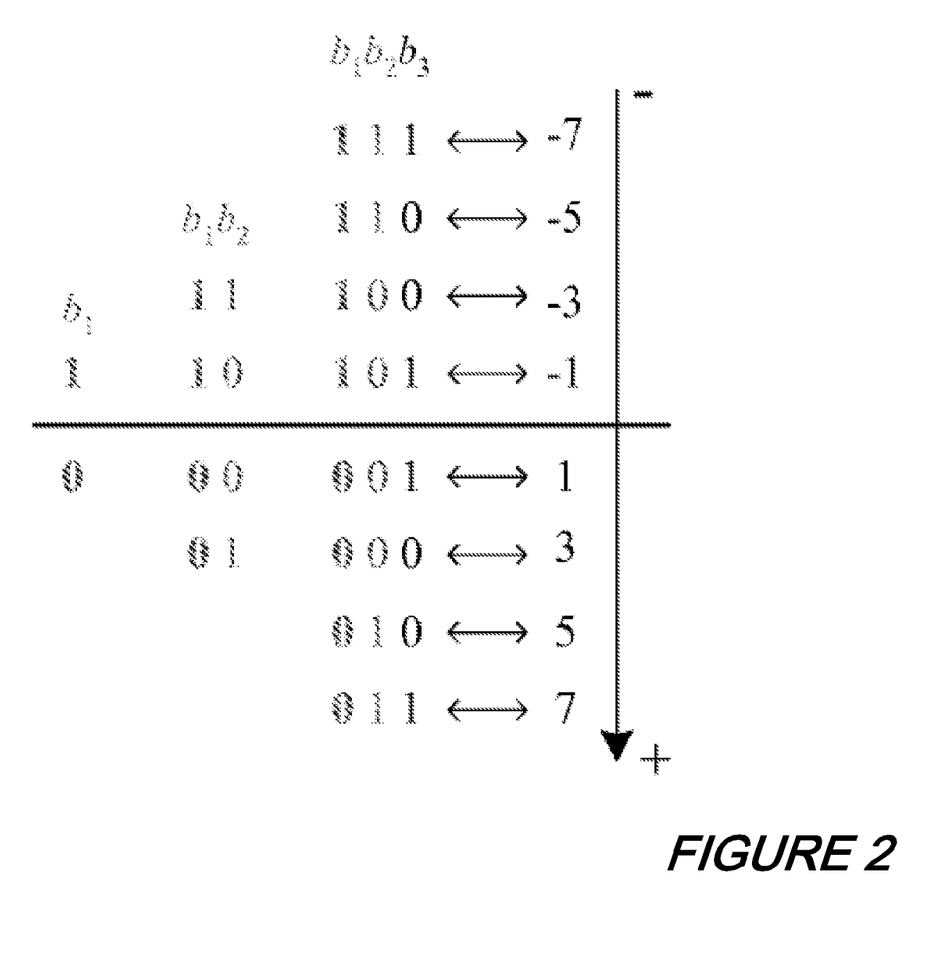
FIG. 2 is a schematic diagram showing labeling of PAM constellations with Gray mapping. From left to right in the diagram—2-PAM, 4-PAM, and 8-PAM according to an aspect of the present disclosure.

FIG. 2 is a schematic diagram showing labeling of PAM constellations with Gray mapping. From left to right in the diagram—2-PAM, 4-PAM, and 8-PAM according to an aspect of the present disclosure.

Figure 3:
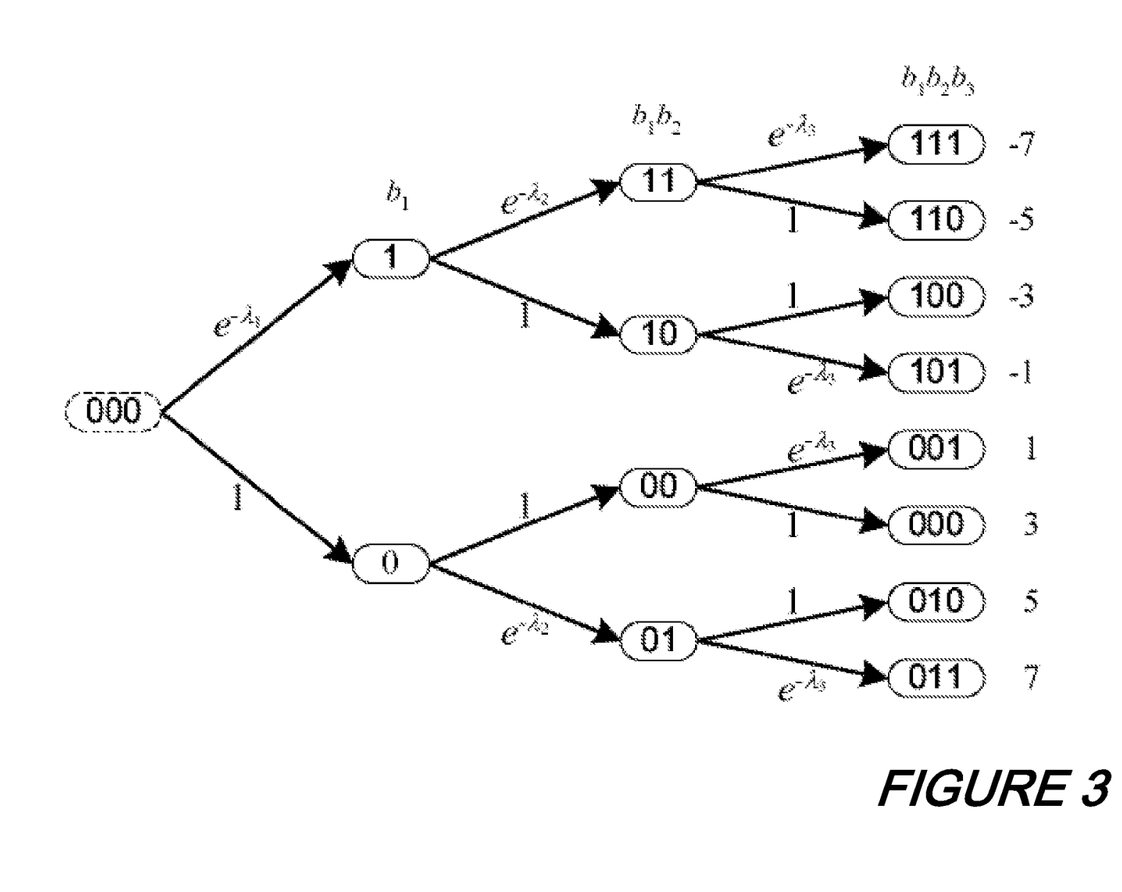
FIG. 3 is a schematic diagram showing a tree representation of updating PAM symbol probabilities for an 8-PAM according to an aspect of the present disclosure.

FIG. 3 is a schematic diagram showing a tree representation of updating PAM symbol probabilities for an 8-PAM according to an aspect of the present disclosure.

Figure 4:
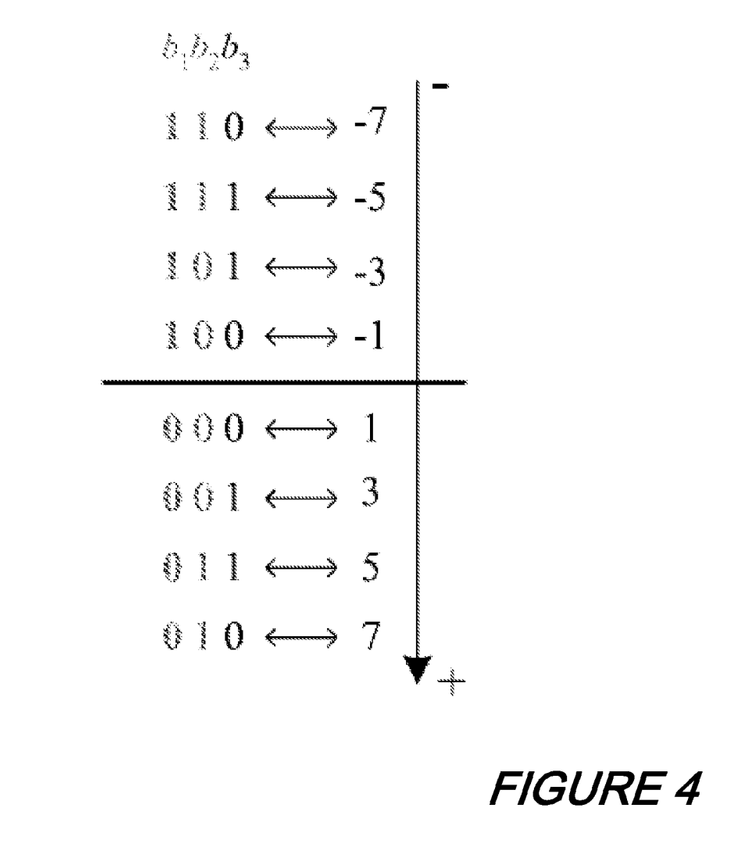
FIG. 4 is a schematic diagram showing another form of Gray mapping for 8-PAM according to an aspect of the present disclosure.

FIG. 4 is a schematic diagram showing another form of Gray mapping for 8-PAM according to an aspect of the present disclosure.

Figure 5:
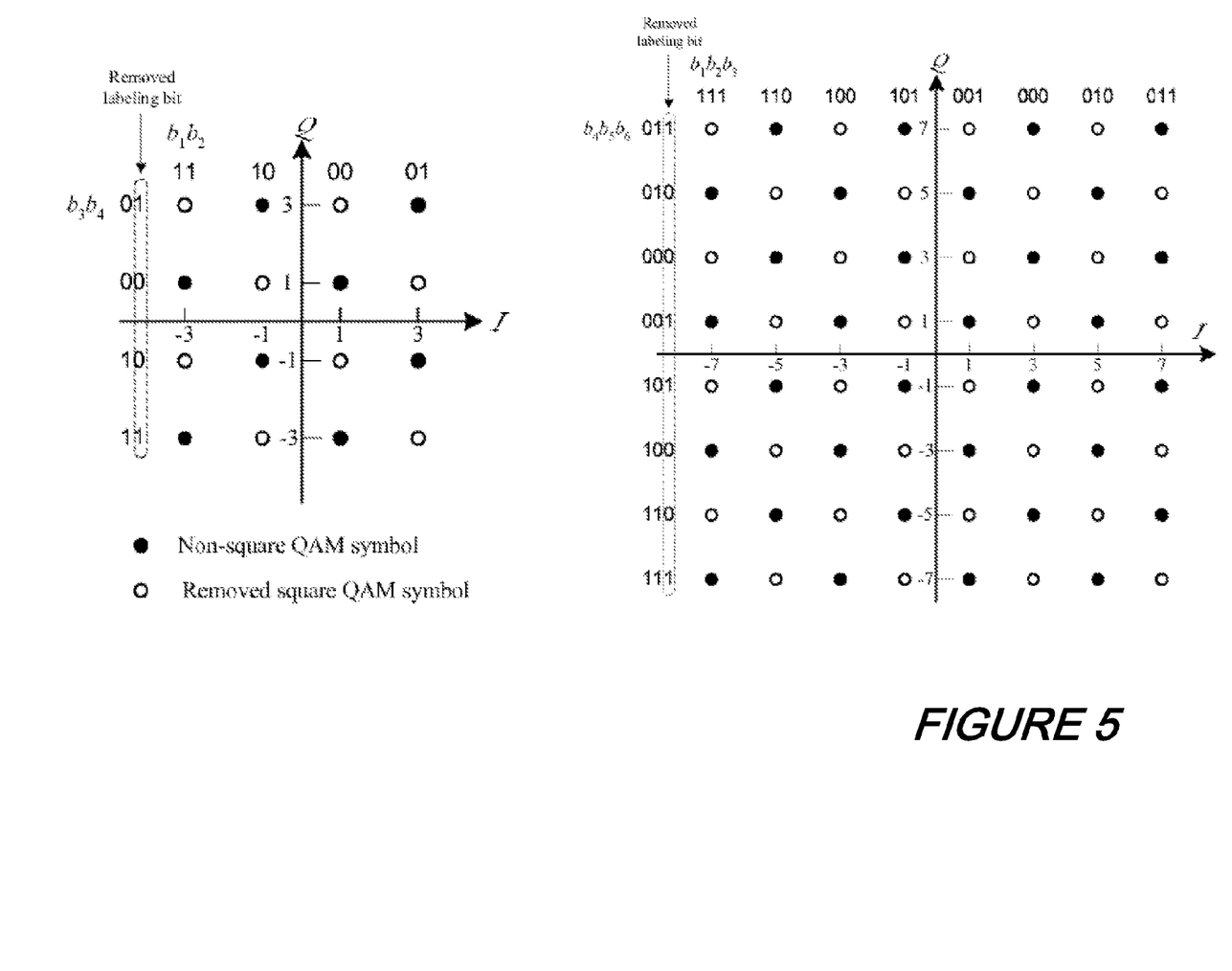
FIG. 5 is a schematic diagram showing examples of non-squared QAM constellations for 8-QAM (left) and 32-QAM (right) according to an aspect of the present disclosure.

FIG. 5 is a schematic diagram showing examples of non-squared QAM constellations for 8-QAM (left) and 32-QAM (right) according to an aspect of the present disclosure.

Figure 6:
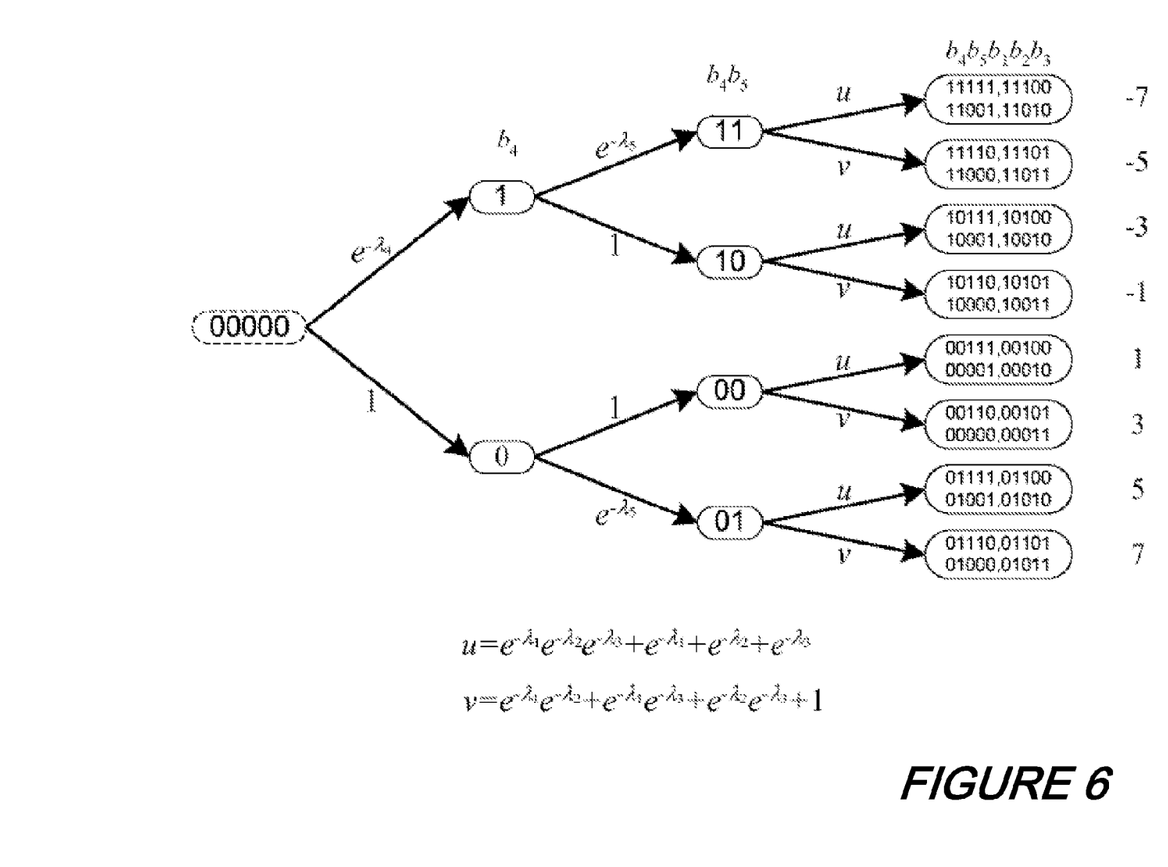
FIG. 6 is a schematic diagram showing a tree representation of obtaining the estimation of the component with (Q-1) labeling bits for the non-squared $2^{2Q-1}$-QAM with Q=3 according to an aspect of the present disclosure.

FIG. 6 is a schematic diagram showing a tree representation of obtaining the estimation of the component with (Q-1) labeling bits for the non-squared $2^{2Q-1}$-QAM with Q=3 according to an aspect of the present disclosure.

Figure 7:
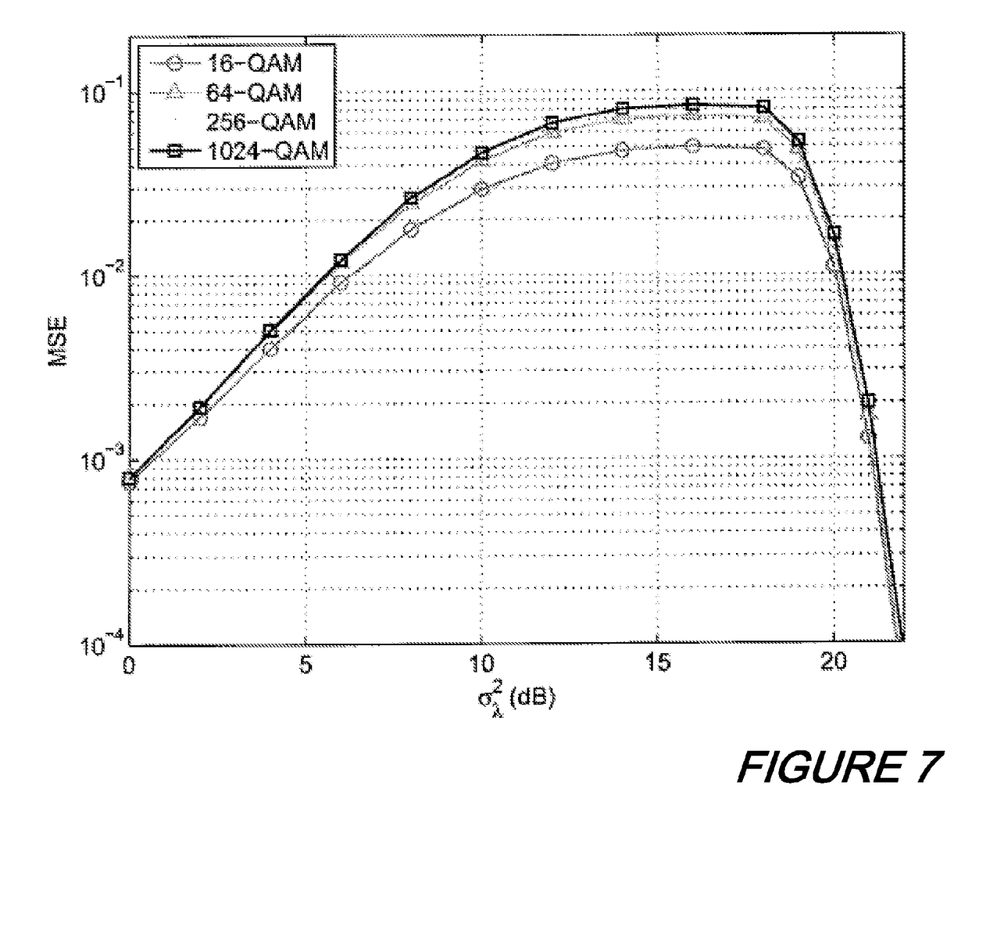
FIG. 7 is a graph showing MSE performance of suboptimal method (Method III) for squared QAM soft estimation according to an aspect of the present disclosure.

FIG. 7 is a graph showing MSE performance of suboptimal method (Method III) for squared QAM soft estimation according to an aspect of the present disclosure.

Figure 8:
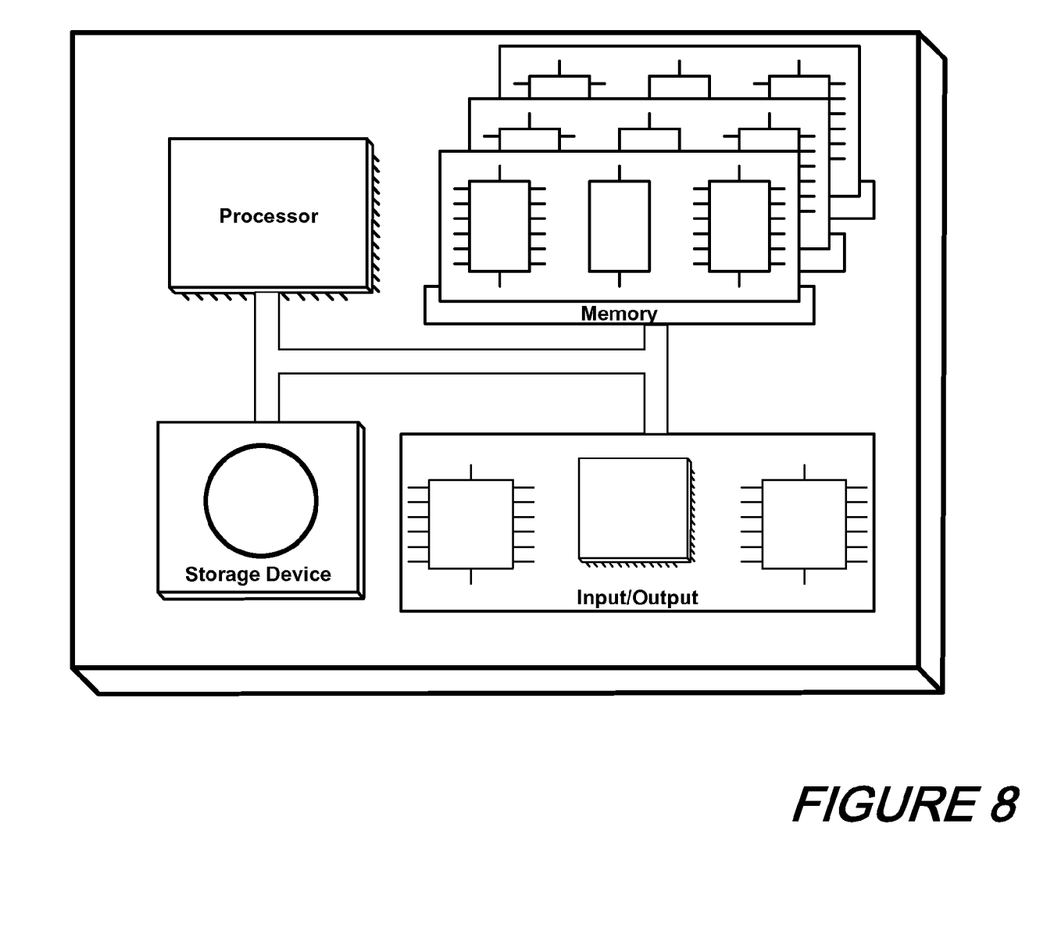
FIG. 8 is a schematic block diagram of an exemplary computing device upon which methods according to an aspect of the present disclosure may be programmed, stored, and executed.

FIG. 8 is a schematic block diagram of an exemplary computing device upon which methods according to an aspect of the present disclosure may be programmed, stored, and executed.

Appendix-A provides a detailed discussion of low complexity methods for soft estimation of QAM symbols according to an aspect of the present disclosure with reference to FIGS. 1-6.

Appendix-B provides a detailed discussion of low complexity methods for soft symbol and variance estimations methods for QAM constellations according to an aspect of the present disclosure with reference to FIGS. 1-7. Appendix-B includes a further Appendix that outlines several analytical proofs of concepts employed in our methods.

The foregoing is to be understood as being in every respect illustrative and exemplary, but not restrictive, and the scope of the invention disclosed herein is not to be determined from the Detailed Description including Appendix-A and Appendix-B, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. For example, the exemplary computer system in FIG. 8 is but an example of the system upon/within methods according to the present disclosure may be stored, programmed and/or executed. Those skilled in the art could implement various other feature combinations without departing from the scope and spirit of the invention.

The invention claimed is:

1. A computer implemented method of producing a soft symbol estimate of a pulse amplitude modulation (PAM) symbol, the method comprising:

determining from one PAM symbol, $s_{N'}$, the following relationship:

$$Pr(x = s_{N'}) = \prod_i P_{b_i}(1) = \prod_i \frac{1}{e^{\lambda_i} + 1},$$

where $\lambda_i$ denotes a log-likelihood ratio (LLR) for the i-th bit $b_i$;

determining, for n=N'-1, . . . , 1, $(Pr(x=s_n))$ sequentially from the following relationship:

$$Pr(x = s_n) = Pr(x = s_{n+1}) \pi_{\check{i}_{n+1,n}, s_{n+1,\check{i}_{n+1,n}} \to s_{n,\check{i}_{n+1,n}}},$$

where $\check{i}_{n+1,n}$ denotes the index of the only different bit between a labeling bit sequence of $s_{n+1}$ and $s_n$; and determining, after determining $Pr(x=s_n)$ for all n, the soft PAM estimation according to the following:

$$\tilde{x} = \sum_{s \in S_{PAM}} s Pr(x=s) = \sum_{n=1}^{N'} s_n \prod_{i=1}^{Q} P_{b_i}(s_{n,i}),$$

where Q is a length of a bit sequence, $N'=2^Q$, $s_{n,i}$ is the ith bit value mapped to the PAM symbol $s_n$ and $P_{b_i}(s_{n,i})$ is determined according to $$P_{b_i}(0) \triangleq Pr(b_i = 0) = \frac{1}{e^{-\lambda_i} + 1},$$

-continued $$P_{b_i}(1) \triangleq Pr(b_i = 1) = \frac{1}{e^{\lambda_i} + 1}.$$

2. The method of claim 1, which further determines PAM estimations for both I and Q components $x^I$ and $x^Q$, and then determines an estimation of a quadrature amplitude modulation (QAM) symbol $x_{qam}$ according to the following relationship:

$$x_{qam} = x^I + jx^Q.$$

* * * * *